(No Model.)
I. SHOUDY, Jr., & L. L. MILLER.
APPARATUS FOR COOKING AND STEAMING FEED.
No. 371,101. Patented Oct. 4, 1887.
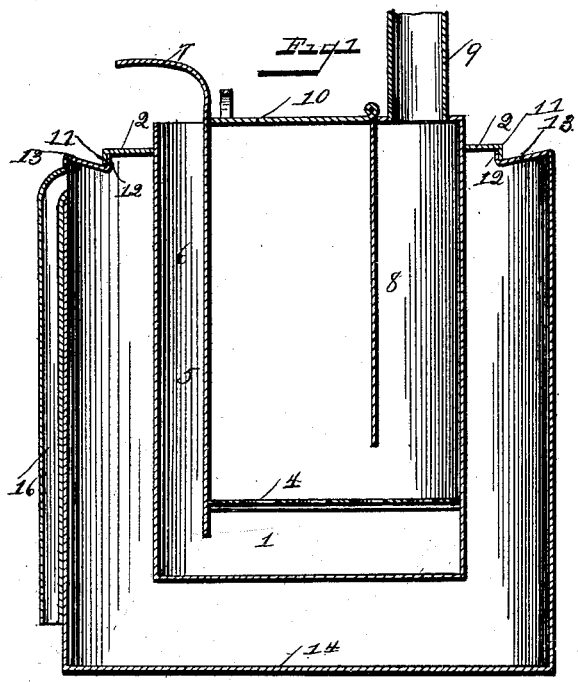
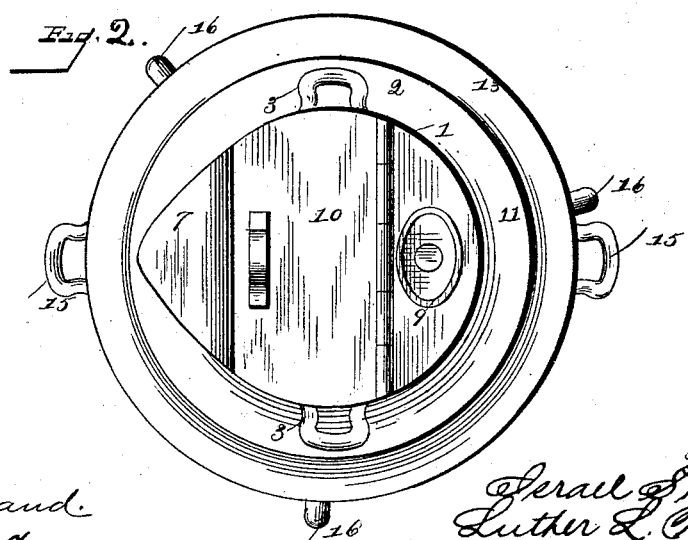

UNITED STATES PATENT OFFICE.

ISRAEL SHOUDY, JR., AND LUTHER L. MILLER, OF PAW PAW, ILLINOIS.

APPARATUS FOR COOKING AND STEAMING FEED.

SPECIFICATION forming part of Letters Patent No. 371,101, dated October 4, 1887.

Application filed March 23, 1887. Serial No. 232,138. (No model.)

*To all whom it may concern:*

Be it known that we, ISRAEL SHOUDY, Jr., and LUTHER L. MILLER, both residents of Paw Paw, in the county of Lee and State of Illinois, have invented certain new and useful Improvements in Apparatus for Cooking and Steaming Feed; and we do hereby declare that the following is a full, clear, and exact description of the invention, which will enable others skilled in the art to which it appertains to make and use the same, reference being had to the accompanying drawings, which form a part of this specification, and in which—

Figure 1 is a vertical sectional view of our improved apparatus for cooking and steaming feed and heating liquids. Fig. 2 is a top view of the entire apparatus.

Similar numerals of reference indicate corresponding parts in both the figures.

Our invention has relation to apparatus for cooking and steaming feed and heating liquids; and it consists in the improved construction and combination of parts of such an apparatus, as hereinafter more fully described and claimed.

In the accompanying drawings, the numeral 1 indicates the cylindrical casing of the cooker and heater, which is provided with an annular flange, 2, at its upper end, and with diverging handles 3, by means of which it may be manipulated and lifted into or out of the steam-casing or the feed-receptacle. The cooking and heating casing has a grate, 4. supported near the bottom, and a flue, 5, is formed by means of a partition, 6, at one side of the casing extending below the grate, and having a curved deflector, 7, at its upper edge curved over the aperture of the flue. Another partition, 8, extends from the upper edge of the casing opposite to the draft-flue, and extends to a short distance above the grate, forming a smoke-flue, which is closed at the top and provided with a suitable pipe or smoke-stack, 9, through which the smoke of the fire upon the grate may be carried off. The fire-box, formed within the casing between the partitions of the flues and above the grate, is closed at its upper end by means of a hinged cover or door, 10. The flange of the cooking and heating cylinder is provided with a downwardly-bent flange or edge, 11, which may fit over a flange, 12, formed upon the inner edge of an inwardly-projecting annular flange, 13, at the upper edge of the steaming-cylinder 14, which is provided with suitable handles, 15, and with downwardly-extending steampipes 16, extending from the upper end of the casing down to near the bottom of the same.

When the apparatus is to be used for cooking or heating feed or liquids, the cooking-casing is placed within a suitable receptacle, 17, which may be a barrel, tub, box, or any other suitable receptacle, whereupon a fire is started upon the grate and fuel filled into the fire-box, which forms a self-feeding magazine, and the fire may now burn without any attention and the feed in the receptacle may be cooked, the draft for the fire passing down through the draft-flue into the space under the grate and through the grate, the smoke being carried off through the smoke-flue and smokestack. In this manner feed may be cooked and liquids heated in a wooden receptacle, or in any receptacle which could not bear direct exposure to fire, and a considerable quantity may be cooked with the consumption of a comparatively small quantity of fuel, as the cooking and heating casing offers a large heating-surface in contact with the feed.

When the apparatus is to be used for steaming hay or other feed, the cooking and heating casing is placed within the steaming-casing, which is again placed within the receptacle for the feed, and when the steaming-casing has been filled with water and the fire started within the cooking and heating casing the water may generate steam within the steaming-casing, which steam may pass downward through the pipes and be forced up through the feed from below.

Having thus described our invention, we claim and desire to secure by Letters Patent of the United States—

In an apparatus for cooking and steaming feed, the combination of a cylindrical cooking and heating casing having a grate near its bottom, and provided with an annular flange at the upper end and with handles, and having a vertical partition forming a draft-flue extending to below the grate, and a partition extending to a distance above the grate, forming a smoke-flue, and having a smoke-stack at the top of the said flue, and a cover or door closing the upper end of the central fire box or compartment, with a steaming-casing having an inwardly-projecting annular flange having the flange of the cooking and heating casing resting upon it, and provided with handles at the upper end and with steam-pipes extending from the top of the casing along the sides of the same to near the bottom, as and for the purpose shown and set forth.

In testimony that we claim the foregoing as our own we have hereunto affixed our signatures in presence of two witnesses.

ISRAEL SHOUDY, JR.
LUTHER L. MILLER.

Witnesses:
H. H. HARRINGTON,
F. CONNOLLY.